Patented May 29, 1928.

1,671,104

UNITED STATES PATENT OFFICE.

NORMAN E. EBERLY, OF PHILADELPHIA, PENNSYLVANIA, ASSIGNOR TO THE S. S. WHITE DENTAL MANUFACTURING COMPANY, A CORPORATION OF PENNSYLVANIA.

DENTAL CEMENT.

No Drawing.      Application filed March 3, 1925. Serial No. 13,001.

My invention relates particularly to that class of cements that are adapted for cementing dental crowns, bridges, facings and inlays, and other such restorations as are required to be tenaciously secured to a supporting element such as a natural tooth, a backing or other suitable attachment mounting, and that may be employed with equal facility in the filling of cavities.

The principal objects of my invention are to provide a dental cement having the combined strength and translucence possessed by silicate cements, and the stickiness and consequent tenacity of adhesion inherent in zinc oxid cements.

Other objects of my invention are to provide a dental cement having adhesive qualities of such tenacity as to withstand the maximum tensile and transverse strains to which crowns, bridgework, and facing are subjected, as well as the strains of compression and shock which cavity fillings and the like are required to withstand.

Further objects of my invention are to provide a dental cement in which no shrinkage occurs in setting, and which will resist penetration, and consequent disintegration.

My invention comprehends a dental cement of such consistency when mixed, as to readily flow into the restricted interstices and crevices when introduced in plastic form and subjected to but slight pressure, and conform in intimate contact to the surfaces thereof.

My invention also includes all of the various novel features of the combinations of ingredients as hereinafter more definitely specified.

I have discovered that combinations of certain calcined basic oxids with the powders commonly used for silicate cements in the proper proportions, will, when mixed with a dental cement liquid, yield a cement of the desired properties of being both translucent and tenaciously adhesive.

In accordance with my invention, the oxids of silicon and aluminum are combined by fusion in the presence of a suitable flux such as calcium fluorid, which may be either natural or artificial. The resulting basic glass thus produced, when finely ground to form a powder, may comprise one of the cement constitutents, which may be mixed with a second constituent produced by the calcination together of selected basic oxids, the product of which may be made wholly or in part of zinc oxid mixed with silica, clay, bismuth oxid and the like, the whole being fritted together at a high temperature and also finely ground to form a cement powder having the desired characteristics.

It will be obvious to those skilled in the art of compounding dental cements that the composition of the constituents mentioned above may be varied over wide limits, depending upon the properties of hardness, setting time, translucence, etc. desired in the finished product.

The silicate powder may consist of aluminum oxid and silicon oxid mixed in the proportions varying from one molecule of $Al_2O_3$ to one molecule of $SiO_2$ to one molecule of $Al_2O_3$ to four of $SiO_2$, such mixtures being combined with from 10% to 50% of suitable fluxes, such as calcium fluorid. I have found that a desirable composition for the purpose consists of aluminum oxid and silicon oxid mixed in the proportions of one molecule of $Al_2O_3$ to two of $SiO_2$ to which mixture is added 30% of calcium fluorid flux, the whole being combined by fusion and finely ground as above described.

The second powder may consist wholly of zinc oxid, calcined at a high temperature and finely ground but I have found that better results are obtained by combining the zinc oxid with other materials, such as the oxids of magnesia, bismuth or silica or siliceous materials such as clay, feldspar, talc, etc. Depending upon the properties desired one or more of these materials may be added to the zinc oxid until the mixture contains from 2% to 20% of them by weight before calcination. I have found that a desirable composition consists of zinc oxid 85%, magnesia 10% and bismuth oxid 5%, the constituents being intimately mixed, calcined at a high temperature and finely ground before use as before described.

The powdered constituents thus produced may be mixed together in suitable proportions which may vary between seventy per cent (70%) of the first powder with thirty per cent (30%) of the second powder, and ninety-eight per cent (98%) of the first powder with two per cent (2%) of the second powder, depending upon the degree of translucence and adhesiveness desired.

The mixture thus combined may be calcined and ground together in a suitable mill until it is reduced to an exceedingly fine, uniform and intimate powder which will pass through a two-hundred (200) mesh screen.

It may be here noted, however, that with powders of certain composition, such as a mixture of seventy per cent (70%) of the first and thirty per cent (30%) of the second, the second powder being made to contain ninety-five per cent (95%) zinc oxid and five per cent (5%) bismuth oxid the calcination may be omitted.

The powdered product thus produced, when combined with suitable pigments, may be employed to form a translucent and tenacious cement when mixed with a liquid consisting of a solution of phosphoric acid in water in which phosphates of zinc and aluminum or other bases are dissolved, powder being added to the liquid until a mass of the desired plasticity is obtained.

I do not desire to limit my invention to the precise details as to proportions and ingredients herein set forth, as various modifications may be made therein without departing from the essential features of my invention as defined in the appended claims.

Having thus described my invention, I claim:

1. A dental cement powder comprising a physical mixture at room temperature of separately produced cement powders each having relatively different physical properties and each by itself being capable of setting and hardening at room temperature when combined with a phosphoric acid solution, said combined powder being capable of setting and hardening at room temperature when combined with a phosphoric acid solution to produce a translucent cement, one of said powders comprising a finely ground basic glass containing silicon and aluminum oxides fused together, and the other powder comprising calcined basic oxides.

2. A dental cement powder comprising a physical mixture of separately produced cement powders, said powder being capable of setting and hardening at room temperature when combined with a phosphoric acid solution to produce a translucent cement, one of said powders being present in the proportion of 70 to 98% and comprising a finely ground basic glass containing silicon and aluminum oxides fused together, and the other cement powder comprising finely ground calcined basic oxides in the proportion of 30 to 2%.

3. A dental cement powder adapted to react with phosphoric acid solution to form a readily flowing mass which sets and hardens at room temperature without shrinking to form a hard translucent and adherent cement, comprising 70 to 98% of finely ground silicon and aluminum oxides which have been fused in the presence of a flux, and 30 to 2% of a finely ground calcined mixture of zinc and bismuth oxides.

4. A dental cement powder adapted to react with phosphoric acid solution to set and harden at room temperature to form a translucent cement, comprising a physical mixture of finely ground basic glass containing silicon and aluminum oxides fused together in the presence of a flux, with finely ground separately produced calcined basic oxides.

5. A dental cement powder adapted to react with phosphoric acid solution to set and harden at room temperature to form a translucent cement, comprising a calcined physical mixture of finely ground silicon and aluminum oxides which have been fused together, with finely ground calcined basic oxides.

In witness whereof, I have hereunto set my hand this twenty-eighth day of February, A. D., 1925.

NORMAN E. EBERLY.